United States Patent
Farhan et al.

(10) Patent No.: US 11,542,186 B2
(45) Date of Patent: * Jan. 3, 2023

(54) TREATMENT OF ACROLEIN AND ACROLEIN BY-PRODUCTS IN WATER AND/OR WASTEWATER

(71) Applicant: EMG International, LLC, Wallingford, PA (US)

(72) Inventors: Yassar Farhan, Wallingford, PA (US); Manaf H. Farhan, Wallingford, PA (US)

(73) Assignee: EMG International, LLC, Wallingford, PA (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/997,499

(22) Filed: Aug. 19, 2020

(65) Prior Publication Data

US 2022/0055928 A1    Feb. 24, 2022

(51) Int. Cl.
| | |
|---|---|
| *C02F 1/74* | (2006.01) |
| *C02F 1/66* | (2006.01) |
| *C02F 9/00* | (2006.01) |
| *C02F 101/34* | (2006.01) |
| *C02F 103/34* | (2006.01) |

(52) U.S. Cl.
CPC .................. *C02F 1/74* (2013.01); *C02F 1/66* (2013.01); *C02F 9/00* (2013.01); *C02F 2101/34* (2013.01); *C02F 2103/34* (2013.01)

(58) Field of Classification Search
None
See application file for complete search history.

(56) References Cited

U.S. PATENT DOCUMENTS

| | | | | |
|---|---|---|---|---|
| 3,909,408 A | * | 9/1975 | Ishida | C07C 45/80 210/757 |
| 3,923,648 A | * | 12/1975 | Lashley, Jr. | C02F 3/02 210/631 |
| 5,606,094 A | | 2/1997 | Roof et al. | |
| 6,227,289 B1 | | 5/2001 | Yokoyama et al. | |
| 2009/0159536 A1 | * | 6/2009 | Hong | B08B 3/10 210/759 |
| 2016/0221848 A1 | * | 8/2016 | Miller | C02F 1/78 |

OTHER PUBLICATIONS

Miller, Chemosphere, 1996, 32, 807-814). (Year: 1996).*
Callahan, M., et al., Water-Related Environmental Fate of 129 Priority Pollutants, vol. I: Introduction and Technical Background, Metals and Inorganics, Pesticides, and PCBs. Office of Water Planning and Standards, Office of Water and Waste Management, USEPA, 1981, Washington, D.C., p. 485.

* cited by examiner

*Primary Examiner* — Clare M Perrin
(74) *Attorney, Agent, or Firm* — Dickinson Wright PLLC

(57) ABSTRACT

A process is disclosed for treating water, such as wastewater, with air or oxygen-enriched air under alkaline conditions to decompose and remove acrolein and acrolein byproducts from the water and/or wastewater. The process is able to lower the concentration of acrolein and acrolein byproducts from water to a sufficiently low level suitable for discharge to a municipal sewer collection system with reduced occurrence of the decomposition by-products of acrolein converting back to acrolein in the water. One embodiment of the process treats contaminated water containing acrolein with air or oxygen-enriched air by sparging or bubbling air or oxygen-enriched air through the contaminated water. The contaminated water can be treated with air or oxygen-enriched air where the contaminated water is initially adjusted to a pH greater than 7.0 for a time to convert at least a portion of the acrolein to 3-hydroxypropanal to obtain fully treated water and prevent conversion of 3-hydroxypropanal back to acrolein.

16 Claims, No Drawings

TREATMENT OF ACROLEIN AND ACROLEIN BY-PRODUCTS IN WATER AND/OR WASTEWATER

FIELD OF THE INVENTION

The invention relates to a process for removing acrolein and acrolein by-products from water by contacting the water with air or air enriched with oxygen under specific alkaline pH conditions. The process particularly relates to complete or nearly complete removal of acrolein and acrolein by-products from water and/or to prevent the potential of any by-products from reverting back to form the parent compound (acrolein) after the treatment unit.

BACKGROUND OF THE INVENTION

Acrolein, an alpha, beta unsaturated aldehyde, is a highly soluble hazardous compound in water (Eisler, 2007, Bowmer et al., 1974). It is highly toxic to bacteria, algae, and aquatic life in water at concentrations between 0.02 mg/L and 2.5 mg/L (USEPA, 2008). It is used as a biocide and an herbicide to control growth of submerged and floating aquatic weeds and algae in irrigation canals and reservoirs, as well as being used to prevent or reduce growth of bacteria in pipes used in petroleum production (USEPA, 2008). It can also be inadvertently produced from the combustion of biodiesels and biofuels in soot or condensate. Acrolein readily reacts with water through a hydration reaction to produce various by-products including 3-hydroxypropanal, acrylic acid, and allyl alcohol (Callahan et al., 1981). This reaction is a potentially reversible reaction that could become the rate-limiting step in the overall removal of acrolein from water. The acrolein hydration by-products can persist in water if they are not directly treated. The rate of acrolein hydration reactions is influenced by pH; specific pH levels result in acrolein transforming to 3-hydroxypropanal and other by-products (UK, 2009).

The required time duration for acrolein reactions and breakdown in water ranges from several hours to a few days. When present in industrial wastewaters discharged to sewers, the extent of natural acrolein breakdown in water will depend on water temperature, pH, other chemicals present in the water, and travel time through the sewer system. Once dissolved in water, acrolein and its by-products do not volatilize out of solution readily (Bowmer et al, 1974). Even if low concentrations of acrolein reach municipal wastewater treatment plants, it can kill or severely inhibit bacterial activity and treatment capacity at those plants (Stack, 1957). Thus, the need for complete removal of acrolein and its byproducts from water and wastewater is well recognized in the wastewater treatment field (Kurian et al., 2001 U.S. Pat. No. 6,277,289 B1).

There are many methods identified for removing acrolein from water including membrane separation, activated carbon, ion exchange resins, and chemical addition. Roof and Reid, 1997 (U.S. Pat. No. 5,606,094) patented a method for directly scavenging acrolein from liquid or gaseous mixtures using sodium bisulfite (Roof and Reid, 1997). Ishida et al., 1975 (U.S. Pat. No. 3,909,408) patented a process for treating aldehydes from a gas or liquid mixture using an aqueous solution of sodium sulfite-sodium bisulfite agents at a solution pH of 6-11 standard units (s. u.). Lashley, 1975 (U.S. Pat. No. 3,923,648) patented a process for disposal of wastewater containing unsaturated aldehydes by maintaining the wastewater at a pH of at least 8 and a temperature between 25° C. and 100° C. (Lashley et al., 1975). Kurian et al., 2001 (U.S. Pat. No. 6,277,289 B1) patented a process for treatment of aqueous aldehydes and/or ketones by contact with organic diamines, triamines, tetraamines, polyamines, and/or inorganic ammonium compounds (Kurian et al., 2001).

Although the available methods, some of which are listed above, have varying degrees of success in degrading and removing acrolein from water; these methods all share the potential of degrading acrolein to its by-products without necessarily removing these by-products during treatment. By not removing acrolein's by-products in water, depending on prevailing pH conditions of the treatment process, acrolein can transform into one of its hydration by-products (e.g., 3-hydroxypropanal) and pass through treatment unchecked, only to revert back to the parent compound (acrolein) at a later time when different pH conditions occur. This reverse reaction can re-introduce acrolein into the treated water stream after it passed through the treatment process, causing elevated/hazardous acrolein concentrations to be discharged into the environment. There remains a need today in industrial applications for a treatment process that effectively and consistently removes both acrolein and its by-products. The objective of the present invention is to promote the degradation of acrolein and its reversible by-products to effectively, substantively and permanently remove acrolein and its by-products, (e.g., 3-hydroxypropanal, acrylic acid, and allyl alcohol) from water.

SUMMARY OF THE INVENTION

Keeping in mind the disadvantages inherent in the known methods of removing acrolein from water, such as wastewater, one objective of this invention is to provide a process for effectively and permanently removing acrolein and acrolein reaction products and/or by-products from water.

Another objective of this invention is to provide a process for removing acrolein and acrolein by-products in contaminated water which does not require a complex series of specialized steps. The contaminated water being treated can be any water source containing acrolein, such as wastewater from an industrial process or facility.

An important objective of this invention is to provide a process for removing acrolein and acrolein reaction products and/or by-products with low associated operations and maintenance (O&M) cost.

A further objective of this invention is to provide a technique of removing acrolein and acrolein reaction products and/or by-products from water, such as wastewater, using readily available materials and methods.

In carrying out these and other objectives, this invention provides, in one form, a process for removing acrolein and acrolein by-products from water by maintaining the pH of the water at alkaline pH and oxygenating the water by contacting it with air or oxygen-enriched air in a manner that effectively and substantially oxidizes both acrolein and acrolein by-products in the water to decompose the acrolein and acrolein reaction products ultimately to form carbon dioxide. In one embodiment, the alkaline pH can be in the range of about pH 8.0 to about pH 12.0 s. u. Also provided herein, in one form, are the experimental procedures for two other processes, namely hydrogen peroxide treatment at alkaline pH, and sodium bisulfite treatment at alkaline pH, that, by contrast, were not effective at substantially removing soluble acrolein and its by-products from water and/or wastewater at the selected dosing rates.

In one embodiment, the process of treating contaminated water containing acrolein includes the steps of adjusting the pH of the contaminated water to an alkaline pH and continuously introducing air or oxygen-enriched air to the contaminated water containing acrolein and/or 3-hydroxypropanal to decompose at least a portion of the acrolein and 3-hydroxypropanal and inhibit the conversion of 3-hydroxypropanal back to acrolein in the treated water. In one embodiment, the process adjusts the pH of the contaminated water to pH 8 or higher to drive the hydration reaction of acrolein to 3-hydroxypropanal, acrylic acid, allyl alcohol and other reaction products. The resulting 3-hydroxypropanal, acrylic acid, and/or allyl alcohol are then oxidized and decomposed in the contaminated water by introducing an oxygen-containing gas, such as air or oxygen-enriched air, into the contaminated water, thereby reducing the acrolein content of the contaminated water.

DETAILED DESCRIPTION OF THE INVENTION

Herein, the term "water" is used to refer to water in many forms, including streams of water, wastewater from any industry or source, natural sources and bodies of water, and mixtures thereof. Contaminated water is intended to refer to water containing levels of acrolein and/or acrolein reaction products such that the contaminated water cannot be discharged to municipal wastewater.

As used herein, the term "alkaline" is used to refer to a water pH above pH 7.0. In one embodiment the contaminated water is adjusted to provide an alkaline pH of a pH of higher than pH 7.0, and generally a pH range between about pH 8.0 and about pH 12.0 s. u. In other embodiments, the alkaline water treatment can be at pH of about pH 8.5 to about pH 11.0.

This invention relates to the process of treating water that contains acrolein and/or acrolein reaction products or acrolein by-products in order to significantly and permanently reduce the concentration of acrolein and acrolein reaction products and/or by-products and convert the acrolein and acrolein reaction products and/or by-products ultimately to carbon dioxide. In one embodiment, the process treats contaminated water containing acrolein to convert at least a portion of the acrolein to 3-hydroxypropanal, acrylic acid, and allyl alcohol, while continuously introducing an oxygen-containing gas, such as air or oxygen-enriched air, in an amount sufficient to decompose at least a portion of the acrolein, 3-hydroxypropanal, acrylic acid, and allyl alcohol. This treatment decomposes the 3-hydroxypropanal, acrylic acid, allyl alcohol, and other reaction products to inhibit the conversion of 3-hydroxypropanal back to acrolein in the water. The process includes an aeration step or oxygenation step to introduce the air or oxygen-enriched air into the contaminated water to provide an oxygen content in the contaminated water to decompose the acrolein and the reaction products obtained by the alkaline treatment. The air can be untreated air. The oxygen-enriched air refers to air having an oxygen concentration greater than 21 wt % and up to 100% oxygen (i.e., pure oxygen). The oxygen-enriched air can prepared as a mixture of air and an oxygen source to provide a predetermined oxygen concentration. In one embodiment, air and an oxygen source can be introduced into the contaminated water simultaneously through a single feed line or through separate feed lines. The oxygen feed rate can be selected and adjusted to maintain a suitable oxygen concentration in the contaminated water to decompose oxidizable compounds in the contaminated water, such as acrolein, 3-hydroxypropanal, acrylic acid, and allyl alcohol.

The process described herein involves contacting air or oxygen-enriched air (through sparging or bubbling) with contaminated water that contains acrolein where the water has an initial alkaline pH, and is maintained at an alkaline pH during the treatment process. The initial alkaline treatment of the contaminated water as an aqueous solution of acrolein converts at least a portion of the acrolein to 3-hydroxypropanal and other reaction products and by-products. The effect of the process is to contact the acrolein and acrolein reaction products, such as 3-hydroxypropanal, with a continuous source of oxygen to substantially decompose and remove acrolein and decompose 3-hydroxypropanal present in the water, and ultimately decompose or convert the acrolein and 3-hydroxypropanal to carbon dioxide, without providing an opportunity for the other potential acrolein by-products, such as allyl alcohol and acrylic acid, to form during treatment. The process step involving alkaline conditions transforms a portion of acrolein (AC) to its reversible hydration by-product, 3-hydroxypropanal. Subsequently, with continuous oxygenation, the process effectively and substantially removes acrolein and its reversible 3-hydroxypropanal (3-HP) from the water by converting the acrolein and/or 3-hydroxypropanal to carbon dioxide by the continuous contact with air or oxygen-enriched air. The contaminated water containing acrolein and acrolein reaction products, such as 3-hydroxypropanal, is aerated or oxygenated with air or oxygen enriched air to provide an oxygen concentration in the contaminated water under alkaline pH to decompose and/or oxidize acrolein, 3-hydroxypropanal, acrylic acid, allyl alcohol and other acrolein reaction products or by-products. Decomposing and removing the 3-hydroxypropanal from the water in the presence of oxygen at alkaline pH inhibits the 3-hydroxypropanal from converting back to acrolein in the water downstream of the treatment zone. The process is able to decompose acrolein, 3-hydroxypropanal and other reaction products in the treated water to a concentration of 1 mg/L or less (0.0001 wt %).

Acrolein's reaction with water, catalyzed by both hydrogen and hydroxide ions, is a reversible, first order hydration reaction which forms 3-hydroxypropanal (β-hydroxypropionaldehyde) as follows (Callahan et al., 1981):

Hydration:

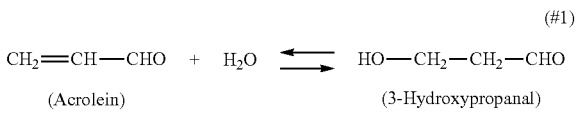

(#1)

$$CH_2\!=\!\!CH\!-\!CHO + H_2O \rightleftharpoons HO\!-\!CH_2\!-\!CH_2\!-\!CHO$$
(Acrolein) (3-Hydroxypropanal)

The hydration reaction, the rate of which increases under alkaline conditions, is the result of nucleophilic attack of the hydroxyl radicals on the outer carbon centers in acrolein (Bowmer and Higgins, 1976). This reaction is reversible and hydration by-products can persist in water for several days (USEPA, 1985; WHO, 1992). It is important to note that, although hydration of acrolein maintains the aldehyde group in the compound, the by-products in water will have different physical properties than acrolein due to the structural changes that occur to the parent compound in water. When acrolein is being degraded or volatilized, the hydration by-products can act as a reservoir for the parent compound and could become the rate-limiting step in the overall removal/loss of acrolein (UK, 2009).

The fact that acrolein easily converts to various reaction products or by-products when dissolved in water can make calculating the total amount removed more complex. In order to provide a clear and accurate calculation of acrolein removal, account must be taken for the removal of acrolein reaction products and byproducts that are created during the hydration reaction in the water treatment process. Therefore, the results herein convert or express the concentration of "acrolein by-products" or "acrolein reaction products" as "acrolein" using molar ratios that are derived from the balanced stoichiometric equation. Specifically, because 3-HP (3-hydroxypropanal) is created during certain steps in the process, in order to facilitate an accurate and meaningful percent removed calculation herein, the measured concentrations of 3-HP in the experimental procedure have been expressed as AC (acrolein) using this stoichiometric calculation.

Based on the balanced stoichiometric reaction (#1) above, and for a complete reaction with water, one (1) mole of AC (56.0 grams/mole), reacts with water to produce one (1) mole of 3-HP (74.0 grams/mole), or 1 mg/L of AC will react with water to produce 1.321 mg/L of 3-HP. Conversely, every 1 mg/L of 3-HP in solution, can be expressed as 0.757 mg/L as AC. To facilitate an accurate and meaningful percent removed, the measured concentration of 3-hydroxypropanal in the experimental procedure is expressed as AC using the stoichiometric calculation. The experimental procedures used herein had a detection limit of 1.0 mg/L for AC and 3-HP, therefore, measured concentrations below 1.0 mg/L were considered non-detect, or zero.

It has also been shown experimentally that this treatment process does not promote the generation of other AC by-products, namely acrylic acid (ACA) and/or allyl alcohol (ALA) that could compromise or interfere with removal of residual acrolein and/or the acrolein reaction products present in the treated water in a downstream treatment process. The proportions or amounts remaining of AC and the reaction products and/or by-products during bubbling/sparging with air at alkaline pH conditions are provided in Table 1 below.

TABLE 1

Removal of Acrolein and its Selected By-Products during Treatment with Air under Alkaline pH Conditions.

| Chemical | Average Concentration (mg/L) | | | Percent Removed (%) |
| --- | --- | --- | --- | --- |
| | Start Time | After 8 hrs | After 36 hrs | |
| AC | 10.10 | 4.85 | <1.0 | — |
| 3-HP (expressed as AC) | 1.64 | <1.0 | <1.0 | — |
| Total (expressed as AC) | 11.74 | 4.85 | <1.0 | 100% |
| pH | | Alkaline | | — |

As shown in Table 1, the sample as measured at the start of the treatment experiment contained both AC and 3-HP as some of the AC added is rapidly converted to 3-HP. As described above, to obtain the initial total AC concentration, the actual measured concentration of AC (10.10 mg/L) was combined with the measured concentration of 3-HP expressed as AC (1.64 mg/L), for a combined total concentration of 11.74 mg/L, AC as expressed. This concentration represents the starting AC concentration before treatment is initiated. The same measurement process was used for all samples. After 36 hours the average total AC concentration was below the detection limit (<1.0 mg/L, expressed as AC). This treatment process achieved a substantial amount of overall AC and related reaction products and/or by-products removal; indeed, 100% removal of AC and related reaction products and/or by-products was measured as a result of this treatment process.

By "substantial amount" it is meant that the total concentration of acrolein and/or its by-products removed after treatment will be in excess of 80% of the total concentration measured in the water and/or wastewater at the start time of the experiment.

Unlike in a controlled laboratory setting, it will be understood that under certain field operating conditions, the water to be treated may initially be adjusted or controlled at alkaline and/or acidic pH for different time periods, and as a result of these varying initial conditions the water may contain only acrolein reaction products and/or by-products, or acrolein or acrolein reaction products and/or by-products with other contaminants or by-products that have a similar molecular structure such as ketones and aldehydes. For example, some water streams may contain a mixture of AC and/or 3-HP among other chemicals such as propionaldehyde (another potential AC reaction product). Regardless of the initial state of such streams with varying conditions, the process will be effective at treating acrolein and acrolein reaction products and/or by-products.

The process in one embodiment for treating contaminated water containing acrolein and/or 3-hydroxypropanal by adding an effective amount of buffer compound, to adjust or increase the pH of the water to about pH 8.0 to about pH 12.0 standard units (s. u.) and then contacting the water with air or oxygen-enriched air for a period of time sufficient to substantially degrade/transform acrolein and acrolein reaction products and/or by-products, such as 3-hydroxypropanal into carbon dioxide. The process of contacting contaminated water with air or oxygen-enriched air tends to change the pH of the water. If contacting water with air decreases the pH of the water to pH of 8.0 or below during the treatment process, the pH of the water can be maintained alkaline by adding an effective amount of buffer.

Aeration units of various sizes and capacities are readily available in the marketplace. Buffer chemicals for increasing the pH of the water to 8.0-12.0 s. u. are readily available in the market. This process does not require the use of particular buffers. Inexpensive, readily available, typically used buffer are effective for this treatment.

To further improve decomposition and removal of acrolein and acrolein by-products by this treatment process, the water is mixed within a reaction chamber by stirring, in the case of batch processes, or by static in-line mixers, baffles or other such means for continuous processes to provide continuous mixing and continuous contact of the air with contaminated water and the acrolein and 3-hydroxypropanal contained in the contaminated water.

The process is effective in the ambient temperature range, defined here as 0° C.-45° C.

The oxygenation treatment at alkaline pH of the contaminated water can be by any suitable air or oxygen-enriched air contact method that provides a sufficient rate and amount of oxygen in the contaminated water to treat the water and decompose acrolein and 3-hydroxypropanal. The air can be supplied as air or oxygen-enriched air at a suitable oxygen concentration to provide the oxygen in an amount to effectively decompose acrolein, 3-hydroxypropanal, and other organic compounds, such as acrylic acid and allyl alcohol, in the contaminated water. In one embodiment, the air or oxygen-enriched air can be introduced to the contaminated water to provide about 0.01 to 10 grams of oxygen per minute per liter of contaminated water. The air or oxygen-enriched air is introduced to the contaminated water to provide oxygen in an amount of 0.001% wt to 1.0% wt of the total weight of the water and acrolein. The contaminated water is contacted, oxygenated, and/or aerated with the air or oxygen-enriched air to decompose the acrolein and 3-hydroxypropamal. The oxygen treatment of the contaminated water decomposes acrolein and 3-hydroxypropanal. It has been found that the rate of decomposition of 3-hydroxypropanal is faster than the decomposition of acrolein so that the alkaline pH can be maintained during the treatment to drive the reaction of acrolein to 3-hydroxypropanal to increase the rate of decomposition and treatment and to prevent the conversion of 3-hydroxypropanal back to acrolein.

EXPERIMENTAL PROCEDURES

The experimental procedure used to demonstrate the treatment process for decomposing and removing acrolein and 3-hydroxypropanal from contaminated water as follows:

1. Prepare a stock solution containing 200 mg/L of acrolein (AC) in water.
2. Set up three (3) Erlenmeyer flasks, add 950 milliliters (mls) of water to each one. Adjust water pH to the range of 4.0-5.0. Maintain the water well mixed with a magnetic stirrer.
3. Add 50 milliliters (mls) of the stock solution containing AC to each flask to increase the starting AC concentration in the flasks to near 10 mg/L. No other contaminants or acrolein by-products are added to the treatment flasks.
4. Collect a sample from each flask and analyze for acrolein (AC), 3-hydroxypropanal (3-HP), acrylic acid (ACA), and allyl alcohol (ALA). This sample is designated as the "0 hrs" sample which represents the starting concentration of acrolein and its by-products prior to initiating treatment.
5. After the "Time 0" sample is collected, adjust the pH of the flask to a pH 8.0-12.0 s. u.
6. Start one of the following treatment processes in each of the flasks. The three treatment processes tested are:
   A) Treatment with hydrogen peroxide;
   B) Treatment with sodium bisulfite; and
   C) Treatment with air.
7. Collect approximately 40 ml samples at each sampling time and analyze the sample for AC, 3-HP, ACA, and ALA.
8. Monitor and maintained pH between 8.0-12.0 s. u. during each treatment by adding small amounts of buffer as needed.
9. For AC and 3-HP analysis, samples are derivatized with 2,4-dinitrophenylhydrazine (DNPH) then analyzed by injecting 10 micro-liters into an Agilent 1290 High-Performance Liquid Chromatography (HPLC) system with Ultra-Violet (UV) detection at 360 nm.
10. For ACA analysis, samples are analyzed by directly injecting 10 micro-liters into the HPLC system with UV detection at 220 nm.
11. For ALA analysis, samples are analyzed by directly injecting 40 micro-liters into the HPLC system with UV detection at 200 nm.
12. All samples are analyzed in duplicates (designated as DUP.)
13. Standard curves relating HPLC-UV area counts to chemical concentration for each of the analyzed chemicals are developed before starting the treatment processes.
14. At the end of each treatment process, calculate the percent removed of AC and its transformation by-products using the following formula:

$$\text{Percent Removed} = \frac{[\text{Total AC}]_{T0} - [\text{Total AC}]_{TFinal}}{[\text{Total AC}]_{T0}} \times 100\%$$

Where:

$[\text{Total AC}]_{T0}$ denotes Total concentration of AC and 3-HP measured at the start time of the experiment, and expressed as AC mg/L $[\text{Total AC}]_{TFinal}$ denotes Total concentration of AC and 3-HP measured at the end time of the experiment, and expressed as AC mg/L 15. To identify unknown peaks of by-products that may appear during the treatment process, use Quadruple Time of Flight Liquid Chromatography Mass Spectrometry (QTOF-LCMS) analysis utilizing an Agilent 6545 QTOF LCMS with Agilent 1290 HPLC system. QTOF-LCMS is a method used for more definitive identification of ionizable sample components with molecular weights less than 2,000 atomic mass unit (amu). QTOF-LCMS provides a highly accurate mass for the molecules (up-to four (4) decimal places), as well as fragmentation spectra and precise elemental composition for the unknown compound.
16. An injection of a standard amount of AC, 3-HP, ACA, and ALA is performed for each chemical during each treatment process to confirm the accuracy of, and chemical recovery from the HPLC-UV method. The recovery of all standard amounts for all four chemicals was consistently measured between 96% and 106% of the injected amount (100%).

Performance results of the three treatment processes tested are shown below.

Treatment A

Treatment of Acrolein and its by-Products with a Hydrogen Peroxide Process at an Alkaline pH of Water and/or Wastewater To evaluate the removal effectiveness of hydrogen peroxide with alkaline pH conditions on AC and its selected by-products, 14 milliliters (mls) of 30% hydrogen peroxide solution was added to one (1) liter of water with a pH between 8.0-12.0 s. u. containing AC. The resulting hydrogen peroxide concentration in the treatment flask is approximately 0.42%, or 4,200 mg/L hydrogen peroxide. This dosing level provides an excess of hydrogen peroxide required to fully remove the starting acrolein concentration of 10 mg/L at neutral pH conditions (EPA, 1999). The hydrogen peroxide treatment process was monitored over a 36-hour period. Samples were collected from the treatment flask at the beginning of the study (before initiating hydrogen peroxide and alkaline pH treatment), and then after 4 hours, 8 hours, 24 hours, and 36 hours of treatment. Samples were analyzed for AC, 3-HP, ACA, and ALA. Results from this treatment process are shown in Table 2 below.

TABLE 2

Removal of Acrolein and its Selected By-Products during Treatment with Hydrogen Peroxide under Alkaline pH Conditions.

| Chemical | Concentration (mg/L) Measured after Hours of Treatment Shown | | | | | Percent AC Removed (%) |
| --- | --- | --- | --- | --- | --- | --- |
| | 0 hrs | 4 hrs | 8 hrs | 24 hrs | 36 hrs | |
| AC | 10.94 | 7.73 | 6.68 | 7.14 | 6.45 | — |
| AC DUP | 11.15 | 7.71 | 6.69 | 7.14 | 6.45 | — |
| 3-HP (expressed as AC) | 1.7 | <1.0 | <1.0 | <1.0 | <1.0 | — |
| 3-HP DUP (expressed as AC) | 1.7 | <1.0 | <1.0 | <1.0 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 12.75 | 7.72 | 6.69 | 7.14 | 6.45 | 49.4% |
| pH (s.u.) | 10.0 | 9.92 | 8.82 | 8.54 | 9.28 | — |

In Table 2, ACA refers to acrylic acid, and ALA refers to allyl alcohol.

As shown in Table 2, the average initial total AC concentration was 12.75 mg/L (expressed as AC). This concentration represents the starting AC concentration before treatment is initiated. After 4 hours of treatment, the average total AC concentration was 7.72 mg/L (expressed as AC). After 8 hours, the average total AC concentration was 6.69 mg/L (expressed as AC). After 24 hours, the average total AC concentration was 7.14 mg/L (expressed as AC), and after 36 hours the average total AC concentration was 6.45 mg/L (expressed as AC). The average ACA concentration and ALA concentration remained below detection (<1.0 mg/L) throughout this treatment. These results show that the hydrogen peroxide reactions at alkaline pH were complete after approximately 8 hours of treatment and that this method overall only achieved 49.4% AC removal (i.e., 50.6% of AC remained).

Treatment B

Treatment with a Sodium Bisulfite Process at an Alkaline pH of Water and/or Wastewater To evaluate the removal effectiveness of sodium bisulfite with alkaline pH conditions on AC and its selected by-products, 7 mls of 10 g/L sodium bisulfate stock solution were added to one (1) liter of water containing AC and maintained at a pH between 8.0 and 12.0 s. u. The resulting starting concentration of sodium bisulfite in this treatment flask was approximately 70 mg/L. This dosing level was chosen based on results reported by Roof and Reid (1997) for sodium bisulfite direct scavenging of acrolein, and because this dosing level represents a practical dosing rate in potential field-scale applications of this treatment technology. Samples were collected from the treatment flask at the beginning of the study (before sodium bisulfite and alkaline pH treatment was initiated), and then after 4 hours, 8 hours, 24 hours, and 36 hours of treatment. Samples were analyzed for AC, 3-HP, ACA, and ALA. Results from this treatment process are shown in Table 3 below.

TABLE 3

Removal of Acrolein and its Selected By-Products during Treatment with Sodium Bisulfite under Alkaline pH Conditions.

| Chemical | Concentration (mg/L) Measured after Hours of Treatment Shown | | | | | Percent AC Removed (%) |
| --- | --- | --- | --- | --- | --- | --- |
| | 0 hrs | 4 hrs | 8 hrs | 24 hrs | 36 hrs | |
| AC | 11.33 | 7.16 | 7.04 | 7.11 | 5.94 | — |
| AC DUP | 11.50 | 7.17 | 7.03 | 7.13 | 5.93 | — |
| 3-HP (expressed as AC) | 1.67 | <1.0 | <1.0 | <1.0 | <1.0 | — |
| 3-HP DUP (expressed as AC) | 1.67 | <1.0 | <1.0 | <1.0 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 13.09 | 7.17 | 7.04 | 7.12 | 5.94 | 54.7% |
| pH (s.u.) | 10.0 | 9.82 | 9.55 | 9.51 | 9.27 | — |

As shown in Table 3, the average initial total AC concentration was 13.09 mg/L (expressed as AC). This concentration represents the starting AC concentration before treatment is initiated. After 4 hours of treatment, the average total AC concentration was 7.17 mg/L (expressed as AC). After 8 hours, the average total AC concentration was 7.04 mg/L (expressed as AC). After 24 hours, the average total AC concentration was 7.12 mg/L (expressed as AC), and after 36 hours the average total AC concentration was 5.94 mg/L (expressed as AC). The average ACA concentration and ALA concentration remained below detection (<1.0 mg/L) throughout this treatment. These results show that the sodium bisulfite reactions at alkaline pH were complete after approximately 4 hours of treatment and that this method overall only achieved 54.7% AC removal (i.e., 45.3% of AC remained).

Treatment C

Treatment with an Aeration Process at an Alkaline pH of Water and/or Wastewater

To evaluate removal effectiveness of aeration with alkaline pH treatment on AC and its selected by-products, air was contacted (via bubbling/sparging) with one (1) liter of water containing AC. The air was bubbled at a rate of 1.2 liters per minute containing an oxygen concentration of 23.2% wt (21% by volume), which equals an oxygen dosing rate of 0.34 grams of oxygen per minute per liter of water. This treatment is workable for air or oxygen-enriched air sparging/bubbling rates between 0.01 grams to 10 grams of oxygen per minute per liter of water (or 1,000 grams). This is equivalent to a sparging or bubbling rate of oxygen into water of 0.001% wt to 1% A wt of the total weight of the contaminated water. The water was maintained at a pH between 8.0 and 12.0 s. u. during this process to promote treatment of acrolein by-products from water. Samples were collected from the treatment flask at the beginning of the study (before air and alkaline pH treatment was initiated), and then after 4 hours, 8 hours, 24 hours, and 36 hours of treatment. Samples were analyzed for AC, 3-HP, ACA, and ALA. Results from this treatment are shown in Table 4 below.

TABLE 4

Removal of Acrolein and its Selected By-Products during Treatment with Air under Alkaline pH Conditions.

| Chemical | Concentration (mg/L) Measured after Hours of Treatment Shown | | | | | Percent AC Removed (%) |
|---|---|---|---|---|---|---|
| | 0 hrs | 8 hrs | 24 hrs | 36 hrs | 84 hrs | |
| AC | 10.00 | 4.85 | 1.39 | <1.0 | <1.0 | — |
| AC DUP | 10.28 | 4.85 | 1.38 | <1.0 | <1.0 | — |
| 3-HP (expressed as AC) | 0.92 | <1.0 | <1.0 | <1.0 | <1.0 | — |
| 3-HP DUP (expressed as AC) | 0.93 | <1.0 | <1.0 | <1.0 | <1.0 | — |
| ACA | <1.0 | <1.0 | <1.0 | <1.0 | <1.0 | — |
| ACA DUP | <1.0 | <1.0 | <1.0 | <1.0 | <1.0 | — |
| ALA | <1.0 | <1.0 | <1.0 | <1.0 | <1.0 | — |
| ALA DUP | <1.0 | <1.0 | <1.0 | <1.0 | <1.0 | — |
| Average Total (expressed as AC) | 11.07 | 4.85 | 1.38 | <1.0 | <1.0 | 100% |
| pH (s.u.) | 10.0 | 9.47 | 9.09 | 8.57 | 8.74 | — |

As shown in Table 4, the average initial total AC concentration was 13.41 mg/L (expressed as AC). This concentration represents the starting AC concentration before treatment is initiated. After 8 hours of treatment, the average total AC concentration was 4.85 mg/L (expressed as AC). After 24 hours, the average total AC concentration was 1.39 mg/L (expressed as AC). After 36 hours, the average total AC concentration was below the detection limit (<1.0 mg/L, expressed as AC), and remained below detection 84 hours (<1.0 mg/L, expressed as AC). The average ACA concentration and ALA concentration remained below detection (<1.0 mg/L) throughout this treatment. These results show that the aeration reactions with acrolein were complete after approximately 24 hours of treatment and that this method effectively and substantially removed AC during that period. The results also show that one AC by-product, 3-HP, accumulated at the beginning of treatment, was effectively and substantially treated after 8 hours of treatment. This treatment process achieved complete overall removal (100% removal) of AC and its by-products.

During laboratory analysis of samples from this treatment Process, no unidentified peaks appeared during the HPLC analysis of any of the samples analyzed.

Many modifications may be made in the present invention without departing from the spirit and scope thereof which are defined only by the appended claims. For example, those skilled in the art may discover that removal of AC and its degradation by-products by air or oxygen-enriched air treatment under alkaline pH conditions works particularly well when other compounds that can influence the pH and the oxygenation treatment process are present in an aqueous solution containing acrolein and its by-products.

REFERENCES

Bowmer, K., and M. Higgins, 1976. Some Aspects of the Persistence and Fate of Acrolein Herbicide in Water. Archives of Environmental Contamination and Toxicology, Vol. 5, 87-96.

Bowmer, K., A. Lang, M. Higgins, A. Pillay, and Y. Tchan. 1974. Loss of Acrolein from Water By Volatilization And Degradation. Weed Research, Vol. 14, 325-328.

Callahan, M., M. Slimak, N. Gabel, I. May, C. Fowler, J. Freed, P. Jennings, R. Durfee, F. Whitmore, B. Maestri, W. Mabey, B. Holt, and C. Gould. 1981. Water-Related Environmental Fate of 129 Priority Pollutants, Volume I: Introduction and Technical Background, Metals and Inorganics, Pesticides, and PCBs. Office of Water Planning and Standards, Office of Water and Waste Management, USEPA, Washington, D.C.

Eisler, R. 2007. Eisler's Encyclopedia of Environmentally Hazardous Priority Chemicals. Elsevier Science, New York, USA. Pp. 986.

Hoigné, J. and H. Bader. 1983. Rate Constants of Reactions of Ozone With Organic And Inorganic Compounds In Water—I: Non-Dissociating Organic Compounds. Water Research, 12:2:173-183.

Ishida, S., N. Oshima, K. Kurita, I. Suzuki, and H. Ohno. 1975. Process for Treating Aldehydes. U.S. Pat. No. 3,909,408.

Kurian, J. and Y. Liang. 2001. Treatment of Aqueous Aldehydes Waste Streams. U.S. Pat. No. 6,227,289 B1.

Lashley, Jr., E. 1975. Detoxification of aldehydes and ketones. U.S. Pat. No. 3,923,648.

Roof, G. and D. Reid. 1997. Acrolein Scavengers. U.S. Pat. No. 5,606,094.

UK, 2009. Directive 98/8/EC concerning the placing of biocidal products on the market, Inclusion of active substances in Annex I to Directive 98/8/EC: Assessment Report Acrolein, Product-type 12 (Slimicide): Annex I. Competent Authority Report: UK. Pp. 48.

United States Environmental Protection Agency (USEPA). 1985. Health and Environmental Effects Profile for Acrolein. Environmental Criteria and Assessment Office, Office of Research and Development. Report No. EPA/600/X-85/369.

United States Environmental Protection Agency (USEPA). 1999. Alternative Disinfectants and Oxidants Guidance Manual. Office of Water. EPA 815-R-99-014. Pp. 346.

United States Environmental Protection Agency (USEPA). 2008. Re-registration Eligibility Decision Acrolein. Prevention, Pesticides And Toxic Substances (7508P)

World Health Organization (WHO). 1992. Environmental Health Criteria 127: Acrolein. World Health Organization, Geneva. 99 pp.

We claim:

1. A process of treating contaminated water containing acrolein comprising the steps of:
    adjusting the pH of said contaminated water containing acrolein to a pH greater than 7.0 to convert at least a portion of said acrolein to obtain partially treated water containing at least acrolein reaction products comprising 3-hydroxypropanal; and
    oxidizing said acrolein and 3-hydroxypropanal in the presence of air or oxygen-enriched air for a time sufficient to decompose at least a portion of said acrolein and 3-hydroxypropanal and obtain a treated water having less than 1 mg/L acrolein and 3-hydroxypropanal.

2. A process of claim 1, wherein the pH of the contaminated water containing acrolein is adjusted to a pH of at least about 8.5 for a sufficient time period to convert at least a portion of said acrolein to 3-hydroxypropanal.

3. A process of claim 2, wherein the oxygen-enriched air comprises an oxygen and air mixture, and where said mixture is contacted with said water to provide oxygen in an amount of 0.001% wt. to 1.0% wt. of the total weight of said water and acrolein.

4. The process in claim 3 wherein the partially treated water contains acrolein and said acrolein reaction products.

5. The process in claim 4 wherein the contaminated water is at a temperature range from about 0° C. to 45° C.

6. The process in claim 5 wherein the partially treated water further comprises at least one selected from the group consisting of acrylic acid and allyl alcohol.

7. The process in claim 6, wherein said contaminated water is treated with said air or oxygen-enriched air by continuously bubbling or sparging said air or oxygen-enriched air through said water in an amount effective to decompose said acrolein, 3-hydroxypropanal, acrylic acid, and allyl alcohol.

8. The process in claim 7 wherein said process includes at least one step selected from the group consisting of mixing the contaminated water within a reaction chamber by stirring, mixing by a batch process, mixing by a static in-line mixer, mixing by a mixer having baffles, and by continuous mixing.

9. The process of claim 7, wherein said air or oxygen-enriched air is an oxygen and air mixture bubbled or sparged in said water at a rate of about 0.01 to about 100 grams of said oxygen and air mixture per hour per liter of water.

10. The process of claim 1, wherein said air or oxygen-enriched air is an oxygen and air mixture and is continuously introduced into said contaminated water at an oxygen dosing rate of 0.001% wt. to 1.0% wt. of the total weight of the contaminated water.

11. The process of claim 1, wherein said air or oxygen-enriched air is introduced continuously to said contaminated water at a rate sufficient and amount to decompose acrolein and 3-hydroxypropanal.

12. The process of claim 1, wherein said contaminated water is industrial wastewater.

13. A process for treating contaminated water containing acrolein, said process comprising the steps of;

adjusting said contaminated water to an alkaline pH and converting at least a portion of said acrolein to 3-hydroxypropanal;

continuously introducing air or oxygen-enriched air into said contaminated water in an amount and for a time sufficient to decompose said acrolein and 3-hydroxypropanal and to obtain treated water having an alkaline pH.

14. The process of claim 13, wherein said alkaline pH of said contaminated water is pH 8.0 to pH 12.0.

15. The process of claim 14, wherein said contaminated water has an acrolein content of about 10 to 13 mg/L and said air or oxygen-enriched air is introduced to said contaminated water in an amount to obtain an oxygen dosing rate 0.001% wt. to 1.0% wt. of the weight of the contaminated water.

16. The process of claim 15, wherein said air or oxygen-enriched air is introduced to said contaminated water at an air dosing rate of about 0.1 to 100 L per minute per liter of said contaminated water.

* * * * *